(12) United States Patent
Goupil et al.

(10) Patent No.: US 8,160,770 B2
(45) Date of Patent: Apr. 17, 2012

(54) METHOD AND DEVICE FOR DETECTING OSCILLATORY FAILURES IN A POSITION SERVOCONTROL SUBSYSTEM OF AN AIRCRAFT CONTROL SURFACE

(75) Inventors: Philippe Goupil, Beaupuy (FR); Ali Zolghadri, Leognan (FR); Loic Lavigne, Beautiran (FR)

(73) Assignees: Airbus Operations SAS, Toulouse (FR); Centre Nationale de la Recherche Scientifique, Paris (FR); Universite de Bordeaux, Talence (FR)

( * ) Notice: Subject to any disclaimer, the term of this patent is extended or adjusted under 35 U.S.C. 154(b) by 520 days.

(21) Appl. No.: 12/334,888

(22) Filed: Dec. 15, 2008

(65) Prior Publication Data
US 2010/0152925 A1  Jun. 17, 2010

(30) Foreign Application Priority Data
Dec. 18, 2007  (FR) ..................... 07 08825

(51) Int. Cl.
*G01M 17/00*  (2006.01)
*G06F 7/00*  (2006.01)
*G06F 19/00*  (2011.01)
*G06F 11/30*  (2006.01)
*G07C 5/00*  (2006.01)

(52) U.S. Cl. ......... 701/33.9; 701/3; 701/29.1; 701/32.8; 701/32.9; 701/33.7; 702/183; 702/189; 702/191; 702/193; 702/196; 244/99.11; 244/99.13

(58) Field of Classification Search .................. 701/1, 3, 701/14, 29; 340/945, 963; 702/127, 144, 702/182–199; 318/560, 609–610, 638, 652, 318/626; 244/35 R, 123.1, 130, 191, 194, 244/195, 99.13, 99.11, 174
See application file for complete search history.

(56) References Cited

U.S. PATENT DOCUMENTS

| | | | | |
|---|---|---|---|---|
| 4,037,806 | A | * | 7/1977 | Hirsch et al. ................. 244/3.16 |
| 5,233,512 | A | * | 8/1993 | Gutz et al. ...................... 700/30 |
| 5,319,296 | A | | 6/1994 | Patel |
| 5,489,829 | A | * | 2/1996 | Umida .......................... 318/561 |

(Continued)

FOREIGN PATENT DOCUMENTS
FR   2 893 911   6/2007

OTHER PUBLICATIONS
Preliminary Search Report dated Mar. 17, 2008 w/ English translation.

*Primary Examiner* — Jack W Keith
*Assistant Examiner* — Rami Khatib
(74) *Attorney, Agent, or Firm* — Dickinson Wright PLLC

(57) ABSTRACT

Disclosed is a method of detecting at least one oscillatory fault in at least one positional slaving chain for at least one airfoil of an aircraft. The method involves estimating a reference position of the airfoil in the absence of a fault, and calculating a residual value based on the difference between the estimated reference position and the actual position measured by at least one sensor. The calculated residual value is compared with at least one predetermined threshold value to determine the number of successive and alternating overshoots of the predetermined threshold value by the residual value, and oscillatory fault is determined based on the determined number.

3 Claims, 3 Drawing Sheets

U.S. PATENT DOCUMENTS

| | | | |
|---|---|---|---|
| 5,598,991 A * | 2/1997 | Nadkarni et al. | 244/203 |
| 6,232,737 B1 | 5/2001 | Kachi | |
| 6,782,296 B2 * | 8/2004 | Hoche | 700/28 |
| 2007/0067078 A1 * | 3/2007 | Salman et al. | 701/34 |
| 2007/0124038 A1 * | 5/2007 | Goupil | 701/29 |
| 2009/0048689 A1 * | 2/2009 | Pelton et al. | 700/33 |
| 2009/0138147 A1 * | 5/2009 | Grinits et al. | 701/14 |

* cited by examiner

METHOD AND DEVICE FOR DETECTING OSCILLATORY FAILURES IN A POSITION SERVOCONTROL SUBSYSTEM OF AN AIRCRAFT CONTROL SURFACE

FIELD OF THE INVENTION

The present invention relates to a method and a device for detecting oscillatory faults in at least one positional slaving chain for an aircraft airfoil, as well as to a system of electric flight controls comprising such a detection device.

The present invention applies to a slaving chain:
which is intended to positionally slave all types of aircraft airfoil, such as ailerons, spoilers or an elevator for example;
which forms part of a system of electric flight controls of the aircraft; and
which comprises:
  said airfoil which is mobile, and whose position with respect to the aircraft is adjusted by at least one actuator;
  said actuator which adjusts the position of said airfoil, as a function of at least one actuation command received;
  at least one sensor which measures the effective position of said airfoil; and
  a computer which formulates an actuation command for the airfoil, transmitted to said actuator, on the basis of said measured effective position and of a control command calculated by the automatic pilot or on the basis of the action of the pilot on a control stick and of the inertial state of the aircraft.

BACKGROUND OF THE INVENTION

It is known that such a slaving chain comprises electronic components which are liable, in failed mode, to generate a spurious signal which may cause the slaved airfoil to oscillate. A phenomenon of this type is called an "oscillatory fault". Another possible cause of the oscillation is the malfunction or breakage of a mechanical part of the actuator.

It is known moreover that, when an oscillatory fault such as this exhibits a frequency which lies inside the bandwidth of the actuator, its effect is:
to generate significant loads on the structure of the aircraft, thereby making it necessary to reinforce this structure, if a dedicated device does not enable this fault to be detected;
to generate excessive loads in the event of excitation of one of the natural modes of vibration of the aircraft (phenomenon of resonance, aeroelastic coupling), and this may, in the extreme case, result in damage to the structure of the aircraft;
to accelerate the fatigue of the actuator or actuators used; and
to reduce the comfort of the aircraft's passengers.

Complete coverage of oscillatory faults such as these would require overly expensive structural reinforcements of the aircraft. In practice, the aircraft is designed to absorb oscillatory faults of a certain amplitude, as a function of frequency. So, monitoring must be put in place to guarantee that the vibrations of the aircraft remain inside a predetermined amplitude/frequency envelope.

Nevertheless, the standard solutions for carrying out such monitoring are highly dependent on:
the hardware used;
the type of law for piloting the aircraft (dependent on the latter's flexibility or inflexibility);
the computer acquisition and generation system; and
the fault modes of said computer.

Consequently, to a particular family of aircraft there always corresponds a particular standard solution, which does not exhibit any guarantee of being applicable to another, existing or future, family of aircraft.

Moreover, the standard monitoring solutions generally exhibit restricted coverage, usually only undertaking detection of the oscillations generated by a particular component of the slaving chain.

The object of patent application FR-05 12000 is to at least partially remedy these drawbacks. It relates to a method, which is robust and which is applicable to any type of aircraft with electric flight controls, for detecting at least one oscillatory fault in at least one positional slaving chain for at least one airfoil of the aircraft, in particular a transport airplane, said method making it possible to detect an oscillatory fault of a minimum amplitude in a number of limited periods, doing so whatever the frequency of this oscillatory fault.

According to this patent application FR-05 12000, the following series of successive steps is carried out in an automatic and repetitive manner:
a) a theoretical position corresponding to a reference position of said airfoil in the absence of a fault is estimated with the aid of the airfoil control command which feeds a model of said actuator;
b) the difference between said theoretical position estimated in step a) and the effective position measured by said sensor is calculated so as to form a residual value; and
c) this residual value is compared with at least one predetermined threshold value, a count is carried out of all the successive and alternating overshoots of said predetermined threshold value by said residual value, and, as soon as the number resulting from said count becomes greater than a predetermined number, an oscillatory fault is detected which represents a periodic signal of sinusoidal type, whose frequency, amplitude and phase follow a uniform law (that is to say do not exhibit any favored values).

This patent application FR-05 12000 therefore makes provision to compare the actual operation of the monitored slaving chain (which is illustrated by the measured effective position), with an expected ideal fault-free operation (which is illustrated by said theoretical position), thereby making it possible to highlight any oscillatory fault when it arises. This comparison is performed by calculating a residual value. Consequently, by virtue of the method of detection of this patent application FR-05 12000, it is possible to detect, in the monitored slaving chain, any oscillatory fault of a given minimum amplitude in a given number of periods.

The model used in the aforesaid step a) comprises a plurality of parameters. Patent application FR-05 12000 provides for the use of constant values, fixed at a mean value, for these parameters. Now, in reality, some of the possible parameters of this model are indeed constants, but others evolve as a function of time. In particular:
a possible parameter which represents the difference between the differential supply pressure across the terminals of the actuator and the pressure at which valves for isolating the actuator open is, for example, dependent on the temperature of the hydraulic fluid and the number of consumers (actuators) on the hydraulic circuit;

a possible parameter illustrating the set of aerodynamic loadings which are exerted on the airfoil depends on a large number of variables, for example the dynamic pressure (therefore the speed of the airplane), the Mach number, the configuration of slats and flaps, the local incidence of the airfoil, etc.; and a possible parameter illustrating the loading caused by the adjacent actuator in damped mode, in the case of two actuators per airfoil, depends mainly on the temperature of the hydraulic fluid.

Consequently, several parameters of the model used in the aforesaid detection method depend on other quantities which vary as a function of time. So, the fact of fixing these parameters at constant values degrades the quality of said model. Now, the quality of this model is very significant, since it conditions the performance of the detection method. Specifically, the more one seeks to detect low fault levels, the higher the quality of the model must be. The use of constant parameters therefore limits the performance of the detection method disclosed by patent application FR-05 12000. So, for an existing airplane, if one were induced to decrease the fault level to be detected, this standard method could no longer be adapted to such a decrease. Furthermore, future airplane construction programmes will certainly seek to optimize the airplane globally so as to improve its performance. This could result in greater demands on the structural layout of the airplane (saving of mass) and therefore in more constraining detection levels and confirmation times. In such a situation, the aforesaid detection method would no longer be sufficiently efficacious.

SUMMARY OF THE INVENTION

The object of the present invention is to remedy these drawbacks. It relates to a method for detecting at least one oscillatory fault in at least one positional slaving chain (of the aforesaid type) of at least one airfoil of an aircraft, in particular of a transport airplane, whose performance is optimized, that is to say which is aimed at detecting lower fault levels in a likewise reduced confirmation time. This slaving chain is of the type comprising:

said airfoil which is mobile, and whose position with respect to the aircraft is adjusted by at least one actuator;

said actuator which adjusts the position of said airfoil, as a function of at least one actuation command received;

at least one sensor which measures the effective position of said airfoil; and a computer which formulates an actuation command for the airfoil, transmitted to said actuator, on the basis of said measured effective position and of a control command calculated by the automatic pilot or on the basis of the action of the pilot on a control stick and of the inertial state of the aircraft.

For this purpose, according to the invention, said method according to which the following series of successive steps is carried out in an automatic and iterative manner:

a) a theoretical position corresponding to a reference position of said airfoil in the absence of a fault is estimated with the aid of said airfoil control command which feeds a model of said actuator;

b) the difference between said theoretical position estimated in step a) and the effective position measured by said sensor is calculated so as to form a residual value; and c) this residual value is compared with at least one predetermined threshold value, a count of all the successive and alternating overshoots of said predetermined threshold value by said residual value is carried out, and, as soon as the number resulting from said count becomes greater than a predetermined number, an oscillatory fault is detected which represents a periodic signal of sinusoidal type, whose frequency, amplitude and phase follow a uniform law, is noteworthy in that in step a), in an automatic and iterative manner, the value of at least one parameter of the model is estimated, moreover, at each iteration by carrying out a joint estimation of the state (which is illustrated by said theoretical position) and of parameters of the model, and the value thus estimated is incorporated into said model in the following iteration.

Thus, by virtue of the invention, real-time estimation of the values of parameters of the model is carried out (the values thus estimated being reinjected into the model), thereby making it possible to improve the qualities of said model and thus to enhance the performance of the method for detecting oscillatory faults. The performance of the monitoring of the oscillatory faults is consequently enhanced both in terms of detection and robustness. This contributes especially to overall optimization of an aircraft, in particular at the level of the structural layout of the latter.

Furthermore, as specified below, the method in accordance with the invention avoids resorting to sensors or to specific gauges for estimating the parameter(s) of the model of the actuator and therefore has no negative impact on the mass budget.

Preferably, in step a):
the following model is used:

$$V(t)=VO(t)\cdot[(\theta 1(t)-\theta 2(t)/S)/(\Delta Pref+(\theta 3(t)\cdot VO(t)^2/S))]^{1/2}$$

in which:
V(t) is a speed (of the rod of the actuator) to be estimated;
VO(t) is a speed controlled by said computer;
S represents the surface area of a transverse section of a piston of the actuator;
$\Delta Pref$ represents a predetermined pressure value; and
$\theta 1(t)$, $\theta 2(t)$ and $\theta 3(t)$ are parameters;
said theoretical position is estimated by calculating said speed V(t) with the aid of said model, then by integrating it; and
moreover, the values of said parameters $\theta 1(t)$, $\theta 2(t)$ and $\theta 3(t)$ are estimated and are incorporated into said model at the following iteration.

In this case, advantageously:
said parameter $\theta 1$ satisfies the relation: $\theta 1=\Delta Pd-Pc$;
$\Delta Pd$ is a differential supply pressure across the terminals of the actuator;
Pc is a pressure at which valves for isolating the actuator open;
said parameter $\theta 2$ represents the set of aerodynamic forces applied to the airfoil; and
said parameter $\theta 3$ represents a damping coefficient which makes it possible to estimate a particular loading generated by the actuator (damping of the adjacent actuator in the case of two actuators per airfoil).

More precisely, in an advantageous manner, in step a):
said model is represented in the form of an augmented non-linear state representation, which comprises a state equation and an observation equation;
during an initialization phase:
an augmented state vector and its covariance matrix are initialized, said augmented state vector containing said theoretical position and said parameters to be estimated;

adjustment parameters which represent covariance matrices of noise illustrating phenomena not modeled in said model are initialized; and during a subsequent phase, the following successive operations α, β, γ and δ are carried out in an iterative manner:

α) for an arbitrary iteration k, the observation equation is updated a posteriori;

β) a Cholesky factorization of the covariance of the a posteriori estimation error and a prediction of the state vector at iteration k are carried out; and γ) the state vector is updated a priori; and δ) the state vector is estimated a priori so as to obtain an estimation of said theoretical position and of said parameters.

The present invention also relates to a device for the automatic detection of at least one oscillatory fault in at least one positional slaving chain (of the aforesaid type) of at least one airfoil (aileron, spoiler, elevator, rudder) of an aircraft, in particular of a transport airplane. As indicated previously, within the framework of the present invention, it is considered that an oscillatory fault is a periodic signal of sinusoidal type, whose frequency, amplitude and phase follow a uniform law, that is to say have no favored values.

According to the invention, said detection device of the type comprising:

first means for estimating, in an iterative manner, with the aid of the airfoil control command and of a model, a theoretical position corresponding to a reference position of said airfoil in the absence of a fault;

second means for calculating the difference between said theoretical position estimated by said first means and the effective position measured by said sensor so as to form a residual value; and third means for:

comparing this residual value with at least one predetermined threshold value;

carrying out a count of all the successive and alternating overshoots of said predetermined threshold by said residual value; and detecting an oscillatory fault as soon as the number resulting from said count becomes greater than a predetermined number, is noteworthy in that said first means are formed so as to estimate, moreover, at each iteration, the value of at least one parameter of said model, by carrying out a joint estimation of the state (which is illustrated by said theoretical position) and of parameters of the model, the value thus estimated being incorporated into said model in the following iteration.

The present invention also relates to a system of electric flight controls of an aircraft, of the type comprising:

at least one standard means (comprising for example a control stick) for generating an airfoil control command for at least one airfoil of the aircraft; and at least one positional slaving chain of this airfoil, of aforesaid type.

According to the invention, this system of electric flight controls is noteworthy in that it comprises, moreover, at least one device, such as previously described, for detecting oscillatory faults.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
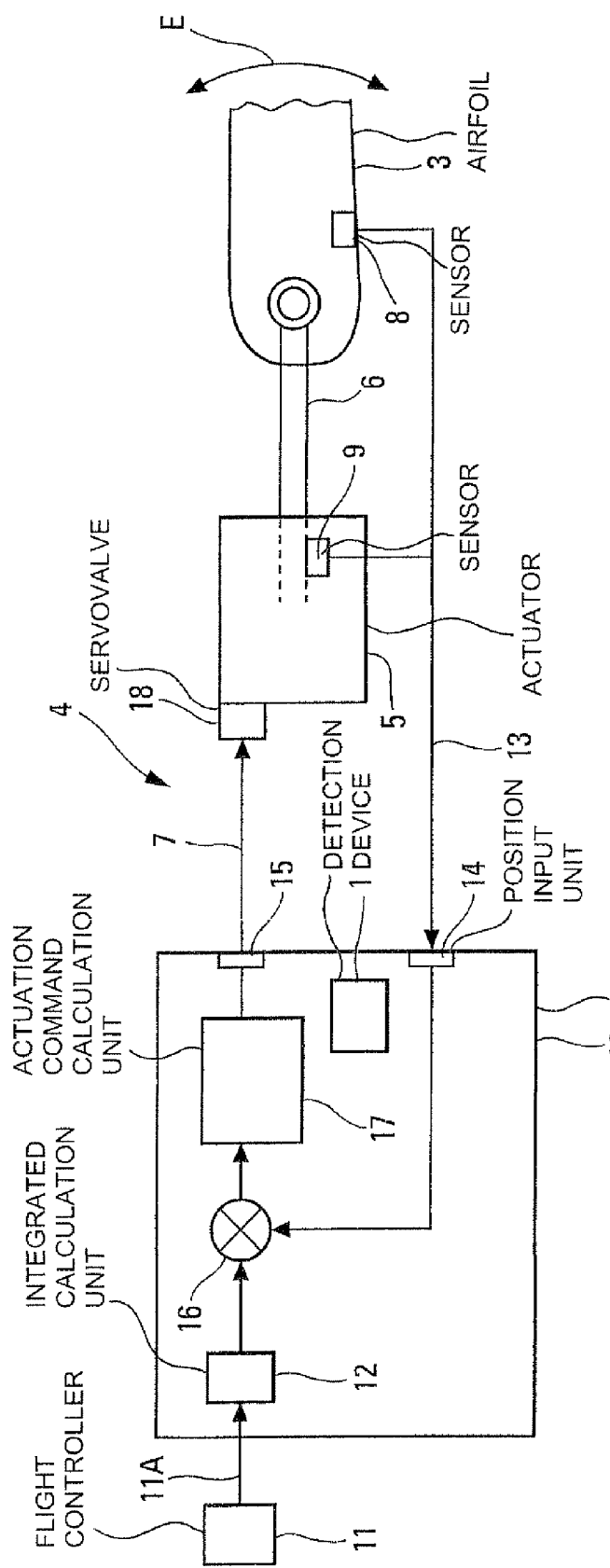
FIG. 1 schematically illustrates a positional slaving chain for an aircraft airfoil, which comprises a detection device in accordance with the invention.
Figure 2:
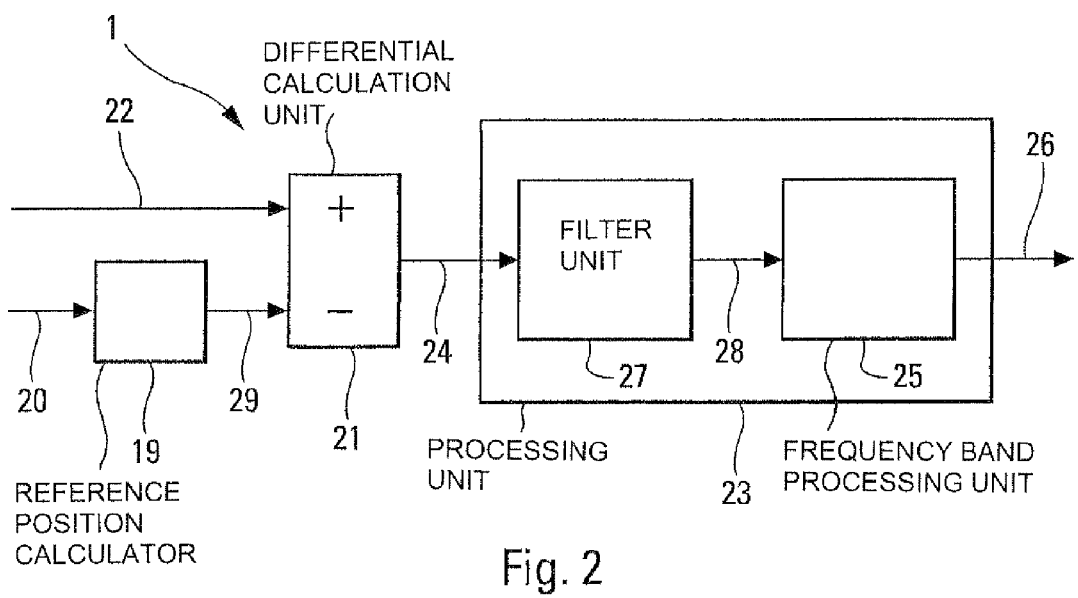
FIG. 2 is the schematic diagram of a detection device in accordance with the invention.

The device 1 in accordance with the invention and represented schematically in FIG. 2 is intended to detect at least one oscillatory fault in at least one positional slaving chain 2 (represented in FIG. 1) of at least one airfoil 3 (aileron, spoiler, elevator, rudder) of an aircraft, in particular of a transport airplane.

In a standard manner, this slaving chain 2 forms part of a system of electric flight controls 4 of the aircraft and comprises:

said airfoil 3 which is mobile, being able to be deflected as illustrated by a double arrow E in FIG. 1, and whose position with respect to the structure of the aircraft is adjusted by at least one standard actuator 5;

said actuator 5 which adjusts the position of said airfoil 3, for example by way of a rod 6 which acts on the latter, as a function of at least one actuation command received by way of a link 7;

at least one sensor 8, 9 which measures the effective position of said airfoil 3. For this purpose, it may be a sensor 8 which is directly associated with the airfoil 3 and/or be a sensor 9 which measures for example the displacement of the rod 6 of the actuator 5; and a computer 10, for example a flight controls computer:

which receives control information from means 11, by way of a link 11A. These means 11 are standard means for generating control information and comprise, for example, a control stick which is able to be actuated by a pilot of the aircraft and inertial sensors;

which formulates in a standard manner an airfoil control command, with the aid of an integrated calculation means 12 which contains piloting laws and which uses for this formulation control information (for example action of the pilot on the control stick, parameters which indicate the position of the aircraft about its center of gravity, load factors that it experiences) received from said means 11;

which receives the effective position measured by the sensor or sensors 8 and 9, by way of a link 13, via an input 14 of analog type;

which calculates on the basis of the above information (airfoil control command and measured effective position) said actuation command, with the aid of an integrated calculation means 17 taking account of a predetermined gain; and which transmits this actuation command to a servovalve 18 of the actuator 5, by way of the link 7 via an output 15 of analog type.

All the elements of this slaving chain 2 which contain electronic components, and especially the sensors 8, 9, the analog input 14, the analog output 15, etc., are sources of oscillatory faults, that is to say of faults which could generate a spurious electrical signal which may cause the airfoil 3 to oscillate.

Said system of electric flight controls 4 comprises, in addition to said slaving chain 2, the device 1 in accordance with the invention which is intended to detect any oscillatory fault of the aforesaid type.

Accordingly, said detection device 1 comprises, as represented in FIG. 2:

- means 19 specified below for determining, in an iterative manner, with the aid of the airfoil control command generated by said calculation means 12 and received by way of a link 20 which is for example connected to the output of said calculation means 12, and with the aid of a particular model, a theoretical position which corresponds to a reference position of the airfoil 3 in the absence of any oscillatory fault and which complies with said airfoil control command;
- a calculation means 21 for calculating the difference between the effective position of the airfoil 3 (which is measured by the sensor 8, 9 and which is received by way of a link 22 which is for example connected to said link 13) and the theoretical position (which is determined by said means 19 and which is received by way of a link 29) so as to form a residual value specified below; and
- a processing unit 23 which is connected by way of a link 24 to said calculation means 21 and which comprises means 25 for:
  - comparing this residual value with at least one predetermined threshold value S;
  - carrying out a count of all the overshoots which are at one and the same time successive and alternating of said threshold value S by said residual value; and
  - detecting an oscillatory fault as soon as the number resulting from said count becomes greater than a predetermined number.

Thus, the device 1 in accordance with the invention compares the actual operation (which is illustrated by the measured effective position of the airfoil 3) of the monitored slaving chain 2 with an expected ideal fault-free operation (which is illustrated by said calculated theoretical position of the airfoil 3), thereby making it possible to highlight any oscillatory fault when it arises. Consequently, said device 1 is able to detect, in the monitored slaving chain 2, any oscillatory fault of a given minimum amplitude in a given number of periods. Furthermore, the device 1 in accordance with the invention makes it possible to detect all the modes of oscillatory failure existing in the slaving chain 2 of aforesaid type, and it is applicable to any type of aircraft.

In a preferred embodiment, said processing unit 23 which can transmit the aforesaid information by way of a link 26 comprises, moreover, filtering means 27 which are connected by way of a link 28 to said means 25 and which are intended to decompose the residual value received into a plurality of frequency bands, thereby making it possible to process denoised residual values and to define a plurality of corresponding time windows, in which the count is thereafter carried out by way of the means 25.

According to the invention, to enhance the detection performance, as well as the robustness of said detection device 1, said means 19 (which implement processings in an iterative manner) are formed so as to estimate, moreover, at each iteration, the value of at least one parameter of the aforesaid model (which is a behavioral model of the airfoil 3 coupled to the actuator 5, and which is excited at input by the airfoil control command), by carrying out a joint estimation of the state (which is illustrated by said theoretical position) and of parameters of the model, the value thus estimated being incorporated into said model in the following iteration, as specified below.

Said means 19 therefore carry out real-time estimation of the values of parameters of the model (the values thus estimated being reinjected into the model), thereby making it possible to improve the qualities of said model and thus to enhance the performance of the device 1 for detecting oscillatory faults. The performance of the monitoring of the oscillatory faults is consequently enhanced both in terms of detection and robustness. This contributes especially to overall optimization of an aircraft, in particular at the level of the structural layout of the latter.

Except for the means 19, the detection device 1 in accordance with the present invention features all the characteristics of the detection device disclosed by the aforesaid patent application FR-05 12000. So, for reasons of simplification and understanding of the present text, these characteristics which form part of the present invention have not been described further here and reference is made to this patent application FR-05 12000 for their detailed description.

The expression for the model used by said means 19 is:

$$\hat{V}(t) = \frac{\hat{V}_0(t)}{\sqrt{\Delta Pref}} \sqrt{(\Delta Pd - Pc) - \frac{F(t)}{S}} \quad (1)$$

in which:
$\hat{V}$ is the speed of the rod 6 of the actuator 5, calculated with the aid of this model. By integrating this speed, said theoretical position of the airfoil 3 is obtained;
t represents time;
F represents the set of loadings which are exerted on the airfoil 3 and the actuator 5;
$\hat{V}_0$ is the speed controlled by the computer 10, which represents the aforesaid airfoil control command;
$\Delta Pd$ is the differential supply pressure across the terminals of the actuator 5 (in bars);
Pc is the pressure at which the isolation valves of the actuator 5 open (in bars);
S is the cross section of the piston (rod 6) of the actuator 5 (in $cm^2$); and
$\Delta Pref$ is a reference pressure (in bars).

The set F of exerted loadings can comprise several terms. Within the framework of the present invention, the two main terms of the following expression are retained:

$$F = Faero + Ka \cdot V^2$$

in which:
Faero represents the set of aerodynamic loadings which are exerted on the airfoil 3; and
$Ka \cdot V^2$ represents, in the case of two actuators 5 per airfoil 3, the loading caused by the adjacent actuator in damped mode.

The model (1) can therefore be written:

$$\hat{V}(t) = \frac{\hat{V}_0(t)}{\sqrt{\Delta Pref}} \sqrt{\Delta P - \frac{Faero + Ka \cdot \hat{V}(t)^2}{S}} \quad (2)$$

with:

$$\Delta P = \Delta Pd - Pc$$

By isolating the speed term $\hat{V}(t)$, the model can be written in the following manner:

$$\hat{V}(t) = \hat{V}0(t) \sqrt{\frac{\Delta P - \frac{Faero}{S}}{\Delta Pref + \frac{Ka \cdot \hat{V}0(t)^2}{S}}} \quad (3)$$

Let θ be the following vector of parameters:

$$\theta = (\theta 1, \theta 2, \theta 3) = (\Delta P, Faero, Ka),$$

the model (3) then becomes:

$$\hat{V}(t) = \hat{V}0(t) \left[ \frac{\theta 1 - \frac{\theta 2}{S}}{\Delta Pref + \frac{\theta 3 \cdot \hat{V}0(t)^2}{S}} \right]^{\frac{1}{2}} \quad (4)$$

In the aforesaid patent application FR-05 12000, a fixed vector θ is used, with for each component of this vector the most probable mean value. Now, in reality, the parameters S and ΔPref are indeed constants, but the parameters ΔP, Faero and Ka evolve as a function of time. In particular, ΔP is, for example, dependent on the temperature of the hydraulic fluid and the number of consumers (actuators) on the hydraulic circuit. Faero depends on a large number of variables, for example the dynamic pressure (therefore the speed of the aircraft), the Mach number, the configuration of the slats and the flaps, and the local incidence of the airfoil 3. As regards Ka, it is mainly dependent on the temperature of the hydraulic fluid. These parameters ΔP, Faero and Ka therefore depend on quantities which vary as a function of time.

The device 1 in accordance with the invention is advantageous since it avoids resorting to sensors or to specific gauges to estimate the parameters of the actuator model, and therefore has no negative impact on the mass budget. For example, without the estimation in accordance with the invention, it would be necessary to install a specific sensor to measure the temperature of the hydraulic fluid and thus estimate the evolution of Ka as a function of time.

As the parameters vary as a function of time, the model (4) may be written in the following manner:

$$\hat{V}(t) = \hat{V}0(t) \left[ \frac{\theta 1(t) - \frac{\theta 2(t)}{S}}{\Delta Pref + \frac{\theta 3(t) \cdot \hat{V}0(t)^2}{S}} \right]^{\frac{1}{2}} \quad (5)$$

Generally, a dynamic system can be described by elements u(t), x(t) and y(t), with u(t) a slaving setpoint (namely the piloting laws in the present invention), y(t) the measured output (namely the measured position of the airfoil 3), and x(t) the state of the system (internal variable in the state representation). In the present invention, the state of the system is the (true) position of the airfoil 3. The model (5) described above therefore becomes:

$$\begin{cases} \dot{x}(t) = \hat{V}0(t) \left[ \frac{\theta 1(t) - \frac{\theta 2(t)}{S}}{\Delta Pref + \frac{\theta 3(t) \hat{V}0(t)^2}{S}} \right]^{\frac{1}{2}} \\ y(t) = x(t) + \text{observation noise} \end{cases} \quad (6)$$

The measured position of the airfoil 3 is the true position marred by observation noise (related to the instrumentation).

Figure 4:
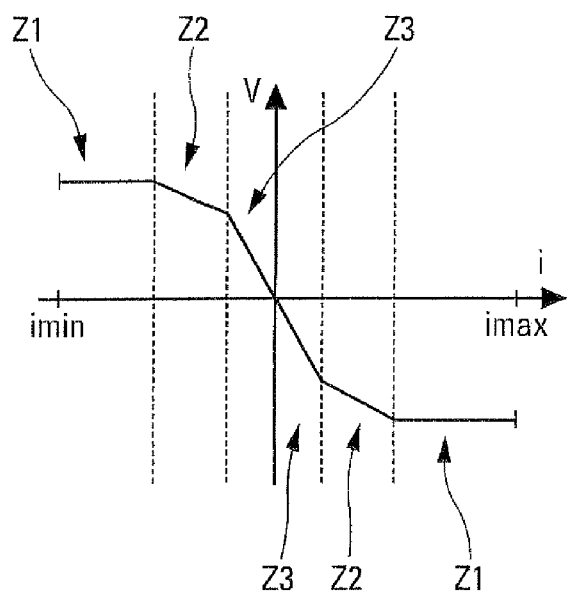
FIG. 4 is a graphic illustrating a gain which is used in the implementation of the invention and which exhibits several slopes.

$\hat{V}0$ corresponds to the speed controlled by the computer 10 and therefore represents the "speed" objective that one seeks to attain. It corresponds to the conversion into mm/s of the current i(t) sent by the computer 10 to the actuator 5. We therefore have the following expression:

$$\hat{V}0(t) = Kci \cdot i(t) = KciK(u(t) - y(t))$$

in which:
K is the gain of the slaving;
u(t)−y(t) represents the slaving error; and
Kci is the gain which allows the conversion of the current i into speed V, single slope or multi-slope, with saturations. An exemplary gain Kci is represented in FIG. 4.

Ultimately, the dynamics of the evolution of the state may be written:

$$\begin{cases} \dot{x}(t) = KciK(u(t) - y(t)) \left[ \frac{\theta 1(t) - \frac{\theta 2(t)}{S}}{\Delta Pref + \frac{\theta 3(t)(KciK(u(t) - y(t)))^2}{S}} \right]^{\frac{1}{2}} \\ y(t) = x(t) + \text{observation noise} \end{cases} \quad (7)$$

To switch from the physical model (5) to the state model (7), the first equation of the model (7) must convey solely the dynamics of the state evolution and y(t) must be replaced by x(t). The second equation relates solely to the measurement. The state model may therefore be written:

$$\begin{cases} \dot{x}(t) = KciK(u(t) - x(t)) \left[ \frac{\theta 1(t) - \frac{\theta 2(t)}{S}}{\Delta Pref + \frac{\theta 3(t)(KciK(u(t) - x(t)))^2}{S}} \right]^{\frac{1}{2}} \\ y(t) = x(t) + \text{observation noise} \end{cases} \quad (8)$$

In the case of a fixed vector θ, it has been noted that in the event of a large dynamic swing in the order of the law, the model become less precise. The solution in accordance with the present invention consists in determining a more precise actuator model by estimating, in real time, jointly the state of the system [namely the (theoretical) position of the airfoil 3] and the parameters ΔP, Faero and Ka which are variable. The estimated parameters are updated at each calculation step of the means 19 and injected into the model.

Consider the following decomposition of y:

$$y = \hat{y} + e$$

where $\hat{y}$ is the output of the model, that is to say the estimated (theoretical) position of the airfoil 3, and e the modeling error, also called the residual, which results from approximating y by $\hat{y}$ (that is to say that part of the data which is not represented by the model).

The model (8) can then be written, discretely, in the form of a so-called "augmented" non-linear state representation:

$$\begin{cases} x(k+1) = f(x(k), u(k), v(k), \theta(k)) \\ y(k) = g(x(k), w(k), \theta(k)) \end{cases} \quad (9)$$

The first equation is called the state equation, and the second equation is called the observation equation. x(k) represents the augmented state vector. It contains the modeled position ŷ and the vector θ of parameters to be estimated. It is therefore of dimension 4. f and g are non-linear functions, v represents the state noise and w the observation noise. w and v are both exogenous noise, added artificially to represent the phenomena not modeled through the state model, which is necessarily imperfect. It is assumed that w and v are both stationary white noise whose covariance matrices may be written:

$$Q = E\{v(k)v(k)^T\} \quad R = E\{w(k)w(k)^T\} \quad (10)$$

These matrices are used as adjustment parameters to control the quality of the predictions, as specified below.

Each parameter is modeled by a dynamic state equation:

$$\theta i(k+1) = \theta i(k) + vi(k) \quad (11)$$

It is known that the problem of recursive estimation of a state can be formulated as a non-linear filtering problem.

On the basis of the knowledge of the uncertainties of the model and of the measurements, the filter estimates, in an optimal manner (within the sense of the minimum variance), the augmented state and its covariance matrix. A polynomial approximation is used to solve the filtering equations. This involves estimating, by a polynomial, a non-linear approximation obtained with a multidimensional version of Stirling's interpolation formula. This scheme is well suited to the present problem, since it does not require the calculation of the Jacobians (contrary, for example, to Kalman filtering), and it is simple to implement, and easily programmable and re-parametrizable.

Figure 3:
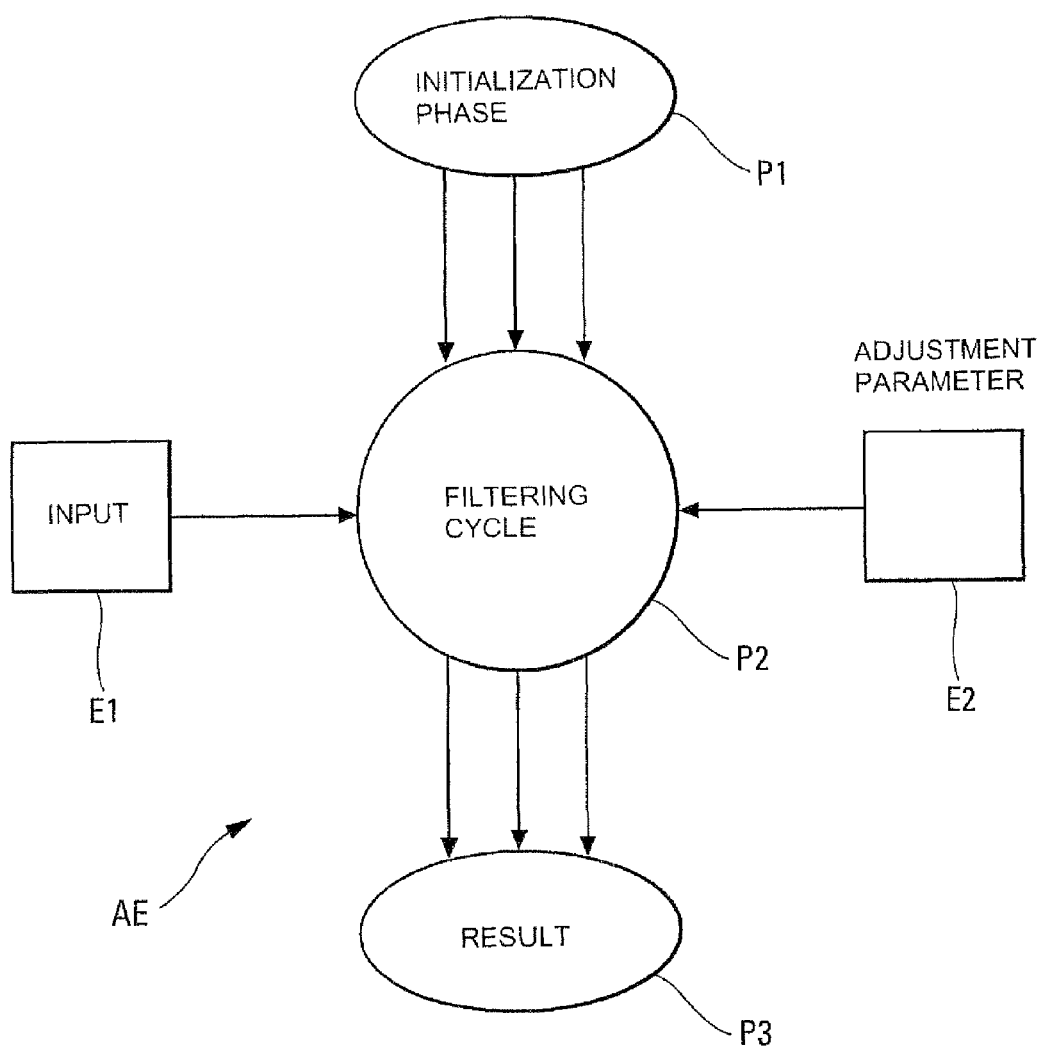
FIG. 3 schematically shows an algorithm for estimating a state vector, in accordance with the invention.

The adaptive estimation algorithm AE which is implemented by the means 19 and which is represented schematically in FIG. 3, chiefly comprises two parts P1 and P2, namely an initialization phase P1, followed by a filtering cycle P2 which comprises phases of estimation, updating and prediction. The taking into account of adjustment parameters Q and R (E2) by the algorithm AE has also been represented in FIG. 3.

The inputs (E1) of this algorithm AE are the setpoint (or piloting law) and the measured position of the airfoil 3. The result (P3) is an estimation at the instant k+1 of the augmented state, therefore of the position of the airfoil 3 and of the parameters of the model.

The synopsis of the algorithm AE is as follows:

A/ step 1 (P1): initialization operations, k=0:
  initialization of the state vector x0 and of its covariance matrix P0; and
  initialization of the adjustment parameters Q and R;

B/ step 2 (P2): estimation/updating/prediction cycle:
  a) a posteriori (that is to say at the moment of the measurement) updating of the observation equation y(k)=g(x(k), w(k),θB(k));
  b) Cholesky factorization of the covariance of the a posteriori estimation error and prediction of the state vector at the instant k;
  c) a priori (that is to say make a prediction, and estimate between two measurements) updating; and
  d) a priori estimation of the extended state vector. Iterate k and return to the first step a).

A detailed description of said algorithm AE is presented hereinafter. Concerning step 1 (P1) [initialization operations, k=0], they comprise the following operations:

A1/ initialization of the state vector x0 and its covariance matrix P0.
  Initializing the state vector x0 amounts to initializing the variable parameters and the position of the airfoil 3. For the variable parameters ΔP and Ka, the initialization value is the most probable mean value, that corresponding to operation under normal conditions. The value zero, corresponding to the value of the airplane on the ground, is chosen for the variable parameter Faero. This first step can be done off-line, once only (constants are chosen as initial value).
  The initial position is that measured by the sensor 8, 9 at the instant k=0.
  The first measurement which is valid, that is to say a measurement which may be different from zero, is considered. The latter initialization is therefore done on-line.
  P0 represents the degree of uncertainty accorded to the initial state. It is chosen to be of diagonal form with very small values;

A2/ initialization of the adjustment parameters Q and R.
  In the general case, the state noise v acts on the parameters of the model (of dimension 3 in the present application), on the state equation (position of the airfoil 3, of dimension 1), on the slaving setpoint u (control law, of dimension 1), as well as on the overall model of the actuator 5 (of dimension 1). The matrix Q is therefore a square matrix of dimension 6. It is always possible, if justified for one of the variables concerned (parameters, state, setpoint, etc. . . . ), to allocate a very small numerical value to the corresponding component in the matrix Q, and to take into account a lower dimension.
  The matrix R represents the variance of the measurement noise w. It is of dimension 1.
  Q and R are chosen diagonal. In a simplified manner, Q and R represent the degree of flexibility (or of confidence) that is accorded respectively to the state model and to the observations. These matrices enter the algorithm through their Cholesky decomposition. It is recalled that any positive definite matrix A (this is the case for Q and R) can be decomposed as $A = XX^T$ where X is an upper triangular matrix. This decomposition, often used in parametric estimation algorithms, makes it possible to ensure very good numerical robustness. The decomposition can be obtained through two successive operations 01 and 02:
  01/ search for the eigenvalues and eigenvectors of A: $A = VDV^t$ where V is the change-of-basis matrix (containing the eigenvectors) and D is a diagonal matrix (the diagonal elements are the eigenvalues of A); and
  02/ calculation of X by Householder triangularization of the matrix $(V*D^{1/2})$. The matrix Q is treated as an adjustment parameter, a flexibility management mechanism which makes it possible to favor either the setpoint (the command of the law), or the output, while limiting the possibilities of variation of each parameter on account of the physical constraints acting on each of them. The order of the law being considered to be correct (dedicated monitoring being performed upstream), very great confidence in this datum is retained, although the confidence in the measured position is less significant. Specifically, in estimating the position, it is desired not to be influenced by the presence of a fault in the measured position. A very low value for the component representing the position, and a more significant value for that representing the command of the law are therefore chosen for Q.

For the matrix R, a very low value is also chosen, since the measured outputs are almost free of noise.

It should be noted that the initialization of the matrices Q, R and P0 is carried out in an empirical manner, after training on actual data. A knowledge of the bounds of the parameters is useful for validating the initialization of Q. For example, it is known that the hydraulic pressure must be greater than a certain minimum value to ensure nominal operation of the actuator 5 and that it may not exceed a maximum value. The bounds on the parameter ΔP are therefore known. it is thus possible to determine the interval of variation of the parameters:

$$\begin{cases} Ka\min < Ka < Ka\max \\ \Delta P\min < \Delta P < \Delta P\max \\ Faero\min < Faero < Faero\max \end{cases}$$

It is therefore possible to look to see whether, with the chosen initialization of Q, the estimated parameters remain in the interval defined above. If such is not the case, the initialization of Q is changed. This verification is predominant in the choice of the parameters for initializing the components of Q corresponding to the three variable parameters.

Additionally, step 2 (P2) representing an estimation, updating and prediction cycle is now specified.

The following operations are done on-line. The discrete time is denoted k. Concerning the notation:

we put $h^2=3$;

for any vector a, na represents the dimension of a. In particular:

nx=4 (number of components of the state vector, dimension of x);

nw=1 (number of sources of measurements noise, dimension of R);

nv=6 (number of sources of state noise, dimension of Q);

ny=1 (number of outputs);

SA is the matrix arising from the Cholesky decomposition of the covariance matrix of the matrix A;

SAj is element j of the matrix SA;

the variables u, x, y, f, g, v and w are those used in the augmented state representation (9) defined above; and $\bar{x}(k+1)$ is the a priori estimation of the extended state vector.

We seek the prediction result, that is to say: $\hat{x}(k+1)=\bar{x}(k+1)$.

As indicated above, step 2 (P2) comprises the following operations:

a) a posteriori updating of the observation equation, that is to say determination of $\bar{y}(k)$. In the general case, we have:

$$\bar{y}(k) = \frac{h^2-nx-nw}{h^2} g(\bar{x}(k)) + \frac{1}{2h^2}\sum_{m=1}^{nx} g(\bar{x}(k), h\bar{s}xm(k)) +$$

$$g(\bar{x}(k), -h\bar{s}xm(k)) + \frac{1}{2h^2}\sum_{m=1}^{nw} g(\bar{x}(k), hswm(k)) + g(\bar{x}(k), -hswm(k))$$

Now, in our case nw=1, the above expression therefore reduces to:

$$\bar{y}(k) = \frac{h^2-nx-nw}{h^2} g(\bar{x}(k)) + \frac{1}{2h^2}\sum_{m=1}^{nx} g(\bar{x}(k), h\bar{s}xm(k)) +$$

$$g(\bar{x}(k), -h\bar{s}xm(k)) + \frac{1}{2h^2} g(\bar{x}(k), hSw) + g(\bar{x}(k), -hSw))$$

with Sw, fixed and of dimension 1, the Cholesky decomposition of the covariance matrix of the observation noise w, and $\bar{s}xm$ element m of the matrix $\bar{S}x$, which is the Cholesky decomposition of the covariance matrix of $\bar{x}(k)$ (calculated at the previous instant);

b) Cholesky factorization of the covariance of the a posteriori estimation error and prediction of the state vector at the instant k:

b1/ calculation of Sy:

$$Sy(k)=\lfloor S1y\bar{x}(k) S1yw(k) S2y\bar{x}(k) S2yw(k)\rfloor$$

with, in the general case:

$$S1y\bar{x}(k) = \{S1y\bar{x}(i,j)\}$$
$$= \left\{\frac{1}{2h}(gi(\bar{x}(k), h\bar{s}xj(k)) - gi(\bar{x}(k), -h\bar{s}xj(k)))\right\}$$

$$S1yw(k) = \{S1yw(i,j)\}$$
$$= \left\{\frac{1}{2h}(gi(\bar{x}(k), hswj(k)) - gi(\bar{x}(k), -hswj(k)))\right\}$$

$$S2y\bar{x}(k) = \left\{\frac{\sqrt{h^2-1}}{2h^2}(gi(\bar{x}(k), h\bar{s}xj(k)) + gi(\bar{x}(k), -h\bar{s}xj(k)) - 2gi(\bar{x}(k)))\right\}$$

$$S2yw(k) = \left\{\frac{\sqrt{h^2-1}}{2h^2}(gi(\bar{x}(k), hswj(k)) + gi(\bar{x}(k), -hswj(k)) - 2gi(\bar{x}(k)))\right\}$$

In the present case, the components of Sy exhibit the following dimensions:

S1y$\bar{x}$: (ny×nx) i.e. (1×4)
S1yw: (ny×nw) i.e. of dimension 1
S2y$\bar{x}$: (ny×nx) i.e. (1×4)
S2yw: (ny×nw) i.e. of dimension 1

We therefore have:

$$S1y\bar{x}(k) = \left\{\frac{1}{2h}(g(\bar{x}(k), h\bar{s}xj(k)) - g(\bar{x}(k), h\bar{s}xj(k)))\right\};$$
$$j = 1, \ldots, 4$$

$$S1yw(k) = \left\{\frac{1}{2h}(g(\bar{x}(k), hSw) - g(\bar{x}(k), -hSw))\right\}$$

$$S2y\bar{x}(k) =$$
$$\left\{\frac{\sqrt{h^2-1}}{2h^2}(g(\bar{x}(k), h\bar{s}xj(k)) + g(\bar{x}(k), -h\bar{s}xj(k)) - 2g(\bar{x}(k)))\right\};$$
$$j = 1, \ldots, 4$$

$$S2yw(k) = \left\{\frac{\sqrt{h^2-1}}{2h^2}(g(\bar{x}(k), hSw) + g(\bar{x}(k), -hSw) - 2g(\bar{x}(k)))\right\}$$

b2/ calculation of the prediction of the state vector at the instant k:

let $L(k)=Pxy(k)[Sy(k)Sy(k)^T]^{-1}$ avec $Pxy(k)=\bar{S}x(k)(S^1y\bar{x}(k))^T$ The prediction of the state at the instant k may be written:

$$\hat{x}(k) = \bar{x}(k) + L(k) \cdot (y(k) - \bar{y}(k))$$

and, by using L(k) and the terms calculated in step b1 above, we have:

$$\hat{S}x(k) = [\bar{S}x(k) - L(k) \cdot S1\bar{y}\bar{x}(k)L(k) \cdot S1yw(k)L(k) \cdot S2y \\ \bar{x}(k)L(k) \cdot S2yw(k)]$$

c) a priori updating of the state, by virtue of the previously calculated quantities:

$$\bar{x}(k+1) = \frac{h^2 - nx - nv}{h^2} f(\hat{x}(k), u(k)) + \\ \frac{1}{2h^2} \sum_{m=1}^{nx} f(\hat{x}(k), h\hat{s}xm(k), u(k)) + f(\hat{x}(k), -h\hat{s}xm(k), u(k)) + \\ \frac{1}{2h^2} \sum_{m=1}^{nv} f(\hat{x}(k), hsvm(k), u(k)) + f(\hat{x}(k), -hsvm(k), u(k))$$

d) the following result is then obtained:

$$\hat{x}(k+1) = \bar{x}(k+1)$$

The vector $\hat{x}(k+1)$ has four components, namely the estimated position $\hat{y}(k+1)$ and an estimation of the parameter vector $\hat{\theta}(k+1)$.

Then, k is iterated (k=k+1), and the previous operations are repeated (starting from step a).

Additionally, said gain Kci generally exhibits saturations and it may have several slopes. The particular case of a gain Kci with dual-slope (which can be generalized to a single slope or to more than two slopes) is now detailed. In this case, we have, by way of illustration, the configuration represented in FIG. 4 which shows the evolution of the speed V (expressed for example in mm/s) as a function of the current i (expressed for example in mA).

Three zones are defined (between values imin and imax of the current i): a saturation zone Z1, a zone Z2 corresponding to a slope a2, and a zone Z3 of slope a3. A different state equation is associated with each of these zones. These three functions, denoted f1, f2 and f3, are used alternately according to the value of the slaving current K(u−y):

$$fi = Kcik(u-y) \left[ \frac{\theta 1 - \frac{\theta 2}{S}}{\Delta Pref + \frac{\theta 3(Kcik(u-y))^2}{S}} \right]^{\frac{1}{2}} ; i = 1, 2, 3.$$

If the current is greater than the saturation value, the function f1 is determined by taking KciK(u−y) equal to a constant whose sign varies according to the sign of the saturated current:

$$KciK(u-y) = a1 \cdot \text{sign}(K(u-y))$$

$$fi = a1 \cdot \text{sign}(K(u-y)) \left[ \frac{\theta 1 - \frac{\theta 2}{S}}{\Delta Pref + \frac{\theta 3(a1 \cdot \text{sign}(K(u-y)))^2}{S}} \right]^{\frac{1}{2}}$$

If the current belongs to the zone Z3, the current-speed characteristic is a straight line with slope a3 and zero ordinate at the origin:

$$Kc3 = a3$$

$$f3 = a3K(u-y) \left[ \frac{\theta 1 - \frac{\theta 2}{S}}{\Delta Pref + \frac{\theta 3(a3K(u-y))^2}{S}} \right]^{\frac{1}{2}}$$

If the current belongs to the zone Z2, the current-speed characteristic is composed of two straight lines of equal slope but of different ordinate at the origin:

$$Kc2 \cdot K \cdot (u-y) = a2 \cdot K \cdot (u-y) + \text{constant}$$

If i>0, with i the slaving current, the following function f2 is obtained:

$$f2 = (a2K(u-y) + b21) \left[ \frac{\theta 1 - \frac{\theta 2}{S}}{\Delta Pref + \frac{\theta 3(a2K(u-y+b21))^2}{S}} \right]^{\frac{1}{2}}$$

with b21 the value deduced from the intersection of the slope of the first zone Z2 (represented in FIG. 4) with the ordinate axis.

On the other hand, if i<0, the following function f2 obtained:

$$f2 = (a2K(u-y) + b22) \left[ \frac{\theta 1 - \frac{\theta 2}{S}}{\Delta Pref + \frac{\theta 3(a2K(u-y+b22))^2}{S}} \right]^{\frac{1}{2}}$$

with b22 the value deduced from the intersection of the slope of the second zone Z2 (represented in FIG. 4) with the ordinate axis.

The invention claimed is:

1. A method of detecting at least one oscillatory fault in at least one positional slaving chain for at least one airfoil of an aircraft, said slaving chain comprising:
   at least one mobile airfoil;
   at least one actuator that adjusts position of said at least one mobile airfoil, as a function of at least one received actuation command;
   at least one sensor which measures actual position of said at least one mobile airfoil; and
   a computer which receives information from an airfoil control command, receives said measured airfoil position information from said at least one sensor, calculates from the received airfoil control command information and the received measured airfoil position information an actuation command, and transmits the actuation command to said actuator,
   wherein the method comprises the successive steps of:
   a) estimating a reference position of said airfoil in absence of a fault;
   b) calculating a residual value based on the difference between said reference position estimated in step a) and the actual position measured by said at least one sensor;

c) comparing the residual value with at least one predetermined threshold value to determine a count based on number of successive and alternating overshoots of said predetermined threshold value by said residual value; and d) determining oscillatory fault based on said count being greater than a predetermined number, wherein in step a):

estimation of the reference position is based on a model represented in the form of an augmented non-linear state representation, which comprises a state equation and an observation equation;

during an initialization phase:

an augmented state vector and its covariance matrix are initialized, said augmented state vector containing said theoretical position and said parameters to be estimated;

adjustment parameters which represent covariance matrices of noise illustrating phenomena not modeled in said model are initialized; and during a subsequent phase, the following successive operations $\alpha, \beta, \gamma$ and $\delta$ are carried out in an iterative manner:

$\alpha$ for an arbitrary iteration k, the observation equation is updated a posteriori;

$\beta$ a Cholesky factorization of the covariance of the a posteriori estimation error and a prediction of the state vector at iteration k are carried out;

$\gamma$ the state vector is updated a priori; and $\delta$ the state vector is estimated a priori so as to obtain an estimation of said reference position and of said parameters.

2. The method as claimed in claim 1, wherein in step a):

the following model is used to estimate the reference position:

$$V(t)=VO(t) \cdot [(\theta 1)-\theta 2(t)/S)/(\Delta Pref+(\theta 3(t) \cdot VO(t)^2/S))]^{1/2}$$
in which:

V(t) is a speed to be estimated;

VO(t) is a speed controlled by said computer (10);

S represents the surface area of a transverse section of a piston (6) of the actuator (5);

$\Delta$Pref represents a predetermined pressure value; and $\theta 1(t)$, $\theta 2(t)$ and $\theta 3(t)$ are parameters.

3. The method as claimed in claim 2, wherein:

said parameter $\theta 1$ satisfies the relation: $\theta 1=\Delta Pd-Pc$;

$\Delta Pd$ is a differential supply pressure across terminals of the actuator;

Pc is a pressure at which valves for isolating the actuator open;

said parameter $\theta 2$ represents a set of aerodynamic forces applied to the airfoil; and said parameter $\theta 3$ represents a damping coefficient of the actuator.

* * * * *